US007628937B2

(12) United States Patent
McCarron et al.

(10) Patent No.: US 7,628,937 B2
(45) Date of Patent: Dec. 8, 2009

(54) PROCESSES FOR MAKING TITANIUM PRODUCTION ANODES

(75) Inventors: Eugene Michael McCarron, Chadds Ford, PA (US); Dennis A. Redder, Hockessin, DE (US); Paul Douglas VerNooy, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/957,529

(22) Filed: Dec. 17, 2007

(65) Prior Publication Data

US 2009/0152507 A1 Jun. 18, 2009

(51) Int. Cl.
*H01B 1/04* (2006.01)
(52) U.S. Cl. .................................... 252/507; 264/105
(58) Field of Classification Search ................ 252/507; 264/104, 105, 614
See application file for complete search history.

(56) References Cited

U.S. PATENT DOCUMENTS

| 5,538,681 A | * | 7/1996 | Wu ............................. 264/432 |
| 5,676,807 A | * | 10/1997 | de Nora et al. ........... 204/243.1 |
| 2008/0048154 A1 | * | 2/2008 | Amirzadeh-Asl et al. ... 252/507 |

FOREIGN PATENT DOCUMENTS

CN          1712571 A1   12/2005

* cited by examiner

*Primary Examiner*—Mark Kopec
(74) *Attorney, Agent, or Firm*—Gail D. Tanzer

(57) ABSTRACT

The present invention relates to processes for making anodes suitable for use in the production of titanium metals. The processes use a kneaded mixture of $TiO_2$ particles, carbon particles, a binder, and a solvent. The mixture is extruded and the solvent is allowed to evaporate to form a green body which is subsequently fired. During firing of the green body, the carbon particles aid in reducing the titanium dioxide to a lower oxide or oxycarbide which can be electrochemically processed into titanium metal.

2 Claims, No Drawings

PROCESSES FOR MAKING TITANIUM PRODUCTION ANODES

FIELD OF THE INVENTION

The present invention relates to processes for manufacturing anodes for the production of titanium metal.

TECHNICAL BACKGROUND

Previous attempts to make anodes relied on grinding together the titania and carbon, perhaps adding a binder, and pressing into pellets. Then the mixture was fired at high temperature under an inert atmosphere (or vacuum) to get partial reaction. This was then ground to a powder, mixed with more carbon, pressed into the desired shape, and fired again. One problem with this technique is the difficulty of getting good mixing between two fine powders which have very different densities. The titania and carbon can easily become unmixed when the lighter carbon floats to the top. Another drawback is that this is a multi-step process requiring grinding a very hard, sintered mass (which takes energy, produces dust, and introduces impurities) and two energy-intensive heating cycles.

Zhu et al. (CN 1712571A) disclose carbothermal reduction and anode formation using physical mixtures of $TiO_2$ and C or TiC. For example, from a titanium oxycarbide anode:

$$Ti(O_{0.5}C_{0.5}) - 2\bar{e} \rightarrow Ti^{+2} + \tfrac{1}{2}CO\uparrow \text{(anode)} \qquad 1.$$

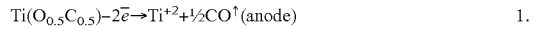

$$Ti^{+2} + 2\bar{e} \rightarrow Ti^0 \text{(cathode)} \qquad 2.$$

The O/C ratio of the anode can deviate from 1. O/C ratios less than 1 are generally considered undesirable because excess carbon will be left behind and present a potential source of Ti metal product contamination. On the other hand, an excess of oxygen can be accommodated by formation of $CO/CO_2$ off-gas mixtures:

$$Ti(O_{0.6}C_{0.4}) - 2\bar{e} \rightarrow Ti^{+2} + 0.2\,CO\uparrow + 0.2\,CO_2\uparrow \text{(anode)} \qquad 3.$$

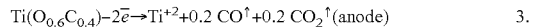

A need exists for processes that include fewer steps, e.g., a single mixing step, a single heating step, and no intermediate grinding to produce an anode.

SUMMARY OF THE INVENTION

One aspect of the present invention is a process comprising:
a) kneading a mixture comprising:
  i) $TiO_2$ particles
  ii) carbon particles
  iii) a binder
  iv) a solvent
  to form a kneaded mixture;
b) extruding the kneaded mixture to form an extruded mixture;
c) allowing the solvent to evaporate from the extruded mixture to form a green body;
d) firing the green body.

Another aspect of the present invention is a process comprising:
a) processing a mixture comprising:
  i) $TiO_2$ particles
  ii) carbon particles
  iii) a binder
  iv) a solvent
in a kneader-extruder to form an extruded mixture;
b) allowing the solvent to evaporate from the extruded mixture to form a green body;
c) firing the green body.

DETAILED DESCRIPTION

The present invention provides processes for making an anode of approximate composition $TiO_{0.5}C_{0.5}$ from $TiO_2$ and carbon which is uniform in composition, conductive, and strong enough to support itself. The anode can be used in the electrochemical production of titanium metal. Furthermore, the process can be run at atmospheric pressure rather than under vacuum.

In one embodiment of the present invention, $TiO_2$ particles, carbon particles, a binder, and a solvent are kneaded to form a mixture. The present inventors have found that using the process disclosed herein, including kneading in the presence of carbon particles, results in the components remaining in the form of a mixture rather than becoming unmixed as can occur with prior grinding and mixing methods. Following kneading, the mixture is extruded and the solvent is allowed to evaporate to form a green body which is subsequently fired. While it is not intended that the present invention be limited by any theory, it is believed that, during the firing of the green body, the carbon particles aid in reducing the titanium dioxide to a lower oxide or oxycarbide which is more easily electrochemically processed into titanium metal.

The kneading and extruding steps produce a green body which, when fired, retains its shape and can directly be used as an anode. Kneading and extruding (which can be combined into one step by a kneader-extruder such those supplied by Charles Ross and Son, Hauppauge, N.Y.) are done on a wet paste or dough with a binder such as cellulose. A typical kneader has two counter-rotating sigma-shaped blades in a cavity or trough. The kneader-extruder adds a discharge auger or screw below the kneading blades. During the kneading cycle, the auger is operating in the reverse direction, feeding new material into the kneading chamber. When the kneading is complete, the auger operates in the forward direction, pushing the material towards the discharge die.

Kneading a wet dough or paste has several advantages to mixing dry powders. The kneading produces an intimate mixture of $TiO_2$ and C; the more intimate the mixing, the shorter the required firing time to achieve a uniform composition. Dust generation is minimized. Nearly any shape can be extruded. The process is scalable and continuous if desired. The density of the fired part can be adjusted by varying the amount of binder and/or burnout agents used.

The material to be processed contains titanium dioxide, carbon, binder, and solvent. The titanium dioxide can be anatase, rutile, brookite, amorphous titania, or any mixture thereof. The titanium dioxide does not need to be stoichiometric. The titanium dioxide can be obtained from any convenient and cost-effective source, and can be produced by any known process (for instance, the chloride or sulfate processes), or obtained by beneficiation of an ore. Preferably, the metallic impurity content of the $TiO_2$ is <2%, more preferred <0.5%, and most preferred <0.1%, by weight of the $TiO_2$.

The carbon source is not critical, although the carbon-titania ratio in the kneaded mixture can be optimized for any given form of carbon. For example, graphite, carbon black, soot, charcoal, lamp black, activated carbon, fullerenes, coal, amorphous carbon, coal tar, pitch, coal tar pitch, or mixtures thereof can be utilized if sufficiently pure for the intended application. For example, ASTM Grade 2 CP Ti metal is about 99.8% pure on a metals basis and is of suitable purity for many applications. The size of the carbon particles is not critical; however, for many applications, the smallest practical particle size is desirable. For example, a particle size of 325 mesh (about 45 microns) or smaller is typical for commercially available carbon and titania particles and is suitable for many applications. A particle size of 5 microns or less is preferred for some applications, and a particle size of 1 micron or less is more preferred. Availability, cost, and purity are typically factors in the selection of carbon source. Preferably, the carbon has a metallic impurity content of less than 3%, more preferred <1%, and most preferred <0.5%, by weight of the carbon.

The binder (or mixture of binders) serves several functions: 1) maintaining the correct viscosity of the kneaded mixture; 2) giving the kneaded mixture the desired elastic, plastic, pseudoplastic, or superplastic rheology suitable for extrusion; 3) maintaining the shape of the extruded part; 4) giving strength to the dried extrudate; and optionally, 5) adding porosity to the fired part, if desired. A binder can be any material known to those skilled in the art which contributes one or more of these properties to the mixture, the extrudate, or the fired part. A partial list includes celluloses, sugars, waxes, resins, gums, polyamides, polyacrylamides, starches, glycols, polyols, and stearic acid. These binders may contribute some carbon to the final composition, depending on their burnout temperature, the heating rate, the firing atmosphere, and their mode of decomposition. The titania/carbon/binder ratio can be optimized for any given choice of titanias, carbons, and binders to yield the desired phase upon firing.

Another type of binder, which is sometimes added to increase the strength of the fired part, is one that decomposes to the desired oxide (for example, TiO or $TiO_2$) upon firing. These include organic titanates such as titanium isopropoxide and titanium salts such as titanium oxynitrate or titanium oxysulfate.

It has been found that, in some embodiments, the present composition can provide an average crush strength of at least 40 pounds when processed into ½" or smaller diameter extrudates.

Crush strength is one way to measure the strength of a fired part, such as an extrudate. A typical commercial catalyst requires a minimum average crush strength of approximately 10 pounds (44.5 Newtons) to withstand the rigors of packaging, transportation, and use without appreciable breakage and attrition. Similarly, a commercial anode for Ti production will need some degree of strength to be self-supporting and survive dissolution in the electrochemical process without falling apart. It is assumed that comparable levels of strength are needed, while acknowledging that commercial anodes will typically be much larger than the extrudates demonstrated herein, and that the strength of a part is, among other parameters, dependent on its dimensions.

In addition, small amounts, for example about 1 weight percent, based on the total weight of materials, of surface active agents known to those skilled in the art, such as surfactants or polyelectrolytes, can be added to improve the wetting of the powders, reduce the pressure required for extrusion, and give the extrudates a smoother appearance. Preferably the amount of surface active agents is less than 5 weight percent. Examples of suitable relative quantities, based on the total weight of materials are as follows: binder from 1 to 10%; $TiO_2$ from 40 to 70%; carbon from 10 to 25%; and solvent from 20 to 50%. Preferred quantities are: binder from 1 to 5%; $TiO_2$ from 45 to 60%; carbon from 12 to 20%; and solvent from 20 to 40%.

Water is a preferred solvent, but other solvents, or mixtures of solvents, can be used. Suitable solvents include water, carboxylic acids, such as acetic acid, alcohols such as methanol and isopropanol, ketones such as acetone and methyl ethyl ketone, aldehydes, such as propanal, alkanes, such as hexane, and aromatics, such as benzene or toluene. Some carbon sources, such as coal tar or pitch, may dictate the preferability of an organic solvent for optimal dispersion and mixing.

The anodes produced are preferably crack-free, extremely strong, uniform, highly conductive, and contain the desired phase. The process can be used to produce anodes for the production of titanium metal by subsequent electrochemical reduction.

EXAMPLES

Materials

The $TiO_2$ was COTIOX KA-100 anatase, obtained from COSMO Chemical Company, Seoul, South Korea.

The carbons used were Columbian Pureblack® carbon (DB100-3001, Marietta, Ga.) in granular form, Chevron 100% acetylenic carbon black (100% compressed, San Ramon, Calif.), and graphite from the Osaka Gas Company (MCMB 6-28, Osaka, Japan).

The cellulose was 2-hydroxyethylcellulose, (average $M_v \approx 720,000$), obtained from Aldrich (Milwaukee, Wis.).

The sucrose was obtained from Aldrich (Milwaukee, Wis.).

The PEG was polyethylene glycol (average $M_n \approx 400$), obtained from EMD Chemicals (Gibbstown, N.J.).

All materials were used as-received.

Equipment

Kneader: PNV-1 Benchtop Kneader from Fuji Paudal Co., Ltd. (Osaka, Japan)

Extruder: Bonnot 1" (2.54 cm) Laboratory Extruder (Uniontown, Ohio)

Methods

X-ray powder diffraction: A compositionally well-defined series of $Ti(O_xC_{1-x})$ phases were synthesized by direct combination of the TiO and TiC end members in various ratios. Their unit cell parameters were determined via Rietveld analysis of X-ray powder diffraction data collected at the Advanced Photon Source at Argonne National Labs (Argonne, Ill.). The cubic unit cell parameter ($a_0$ (Å)) was shown to be a function of composition (mole fraction (x) of O in $Ti(O_xC_{1-x})$), obeying the cubic equation, $a_0$ (Å)=−0.0643 $x^3$−0.0603 $x^2$−0.0198x+4.3308; $R^2$=0.9986. Anode samples were finely ground and similarly analyzed. The resulting cubic lattice parameter, $a_0$, was then used to calculate the oxygen and carbon concentrations using the formula given above.

Apparent density: The volume of a piece of cylindrical calcined extrudate was determined from its height and diameter as measured with calipers. The apparent density is the weight divided by the volume.

Conductivity: The samples used for conductivity measurements were cylindrical pieces of known length and diameter. The resistance of the fired extrudates was measured with a milli-ohmmeter (LOM-4000, IET Labs, Westbury, N.Y.) using the four-terminal Kelvin method. The reported conductivity (in Siemens/meter) is the reciprocal of the specific resistivity. The specific resistivity of the extrudate is equal to the measured resistance times the cross-sectional area divided by the length.

Crush strength: The crush strengths were measured with an Imada digital force gauge, model DPS-44R, mounted on the SV1 lever-operated stand (Northbrook, Ill.). The force gauge has a tip with a 1/8"×1/4" flat area. On the base of the stand is an anvil with a 1/8"×2" flat plateau on top. The anvil is positioned so the flat areas on the tip and the anvil are aligned and meet with no gap. A piece of calcined extrudate (1 inch or longer, to eliminate edge effects) was placed on the anvil perpendicular to the plateau. The tip was lowered onto the extrudate, and then increasing pressure was applied until the extrudate was crushed. This was repeated on several samples from each batch and the results were averaged. The limit of the force gauge is 48.6 pounds (216 Newtons). It is recognized that extrudate diameter will have an effect on crush strength, and thus strength comparisons are preferably made on similar-sized samples.

Example 1

500.00 g $TiO_2$, 134.27 g Chevron carbon ($C/TiO_2$=1.79), and 19.0 g cellulose were rolled in a 2-liter plastic jar for 2 hours to mix well. 382.5 g of this mixture was kneaded with 244 g water and 2.44 g PEG for about 100 minutes. The paste was extruded into 1/4" diameter cylinders and allowed to air dry. A sample was heated in a high temperature furnace under one atmosphere of argon gas at 30° C. per minute to 1800° C. and held at that temperature for one hour. The extrudates were strong, conductive, and sintered with retention of their shape without cracking (no cracking was observed upon visual inspection). The composition was determined by X-ray diffraction to be single phase $Ti(O_{0.564}C_{0.436})$. The apparent density was 2.88 g/cc. The specific conductivity was $2.96 \times 10^5$ S/m. The crush strength exceeded 48.6 pounds (216 Newtons), which is the limit of the gauge.

Example 2

This example demonstrates that sucrose may be partially substituted for cellulose. This example also demonstrates (vs. 1) that as the $C/TiO_2$ ratio decreases, the carbon content of the resultant single phase $Ti(O_xC_{1-x})$ material also decreases. 545.11 g $TiO_2$, 138.66 g Chevron carbon ($C/TiO_2$=1.69), 10.93 g cellulose, and 5.66 g sucrose were rolled in a 2-liter plastic jar for 2 hours to mix well. 451 g of this mixture was kneaded with 278.60 g water and 2.76 g PEG for about 120 minutes. The paste was extruded into 1/4" diameter cylinders and allowed to air dry. The sample was heated in a high temperature furnace under one atmosphere of argon gas at 5° C. per minute to 1800° C. and held at that temperature for one hour. The extrudates were strong, conductive, and sintered with retention of their shape without cracking. The composition was determined by X-ray diffraction to be single phase $Ti(O_{0.586}C_{0.414})$. The apparent density was 2.37 g/cc. The specific conductivity was $2.01 \times 10^5$ S/m. The crush strength exceeded 48.6 pounds (216 Newtons), which is the limit of the gauge.

Example 3

This example demonstrates (vs. 1) that the binder (cellulose in this case) contributes to the $C/TiO_2$ ratio and consequently raises the carbon content of the resultant single phase $Ti(O_xC_{1-x})$ material. 400.00 g $TiO_2$, 107.42 g Chevron carbon ($C/TiO_2$=1.79), and 45.63 g cellulose were rolled in a 2-liter plastic jar for 120 minutes to mix well. 487.58 g of this mixture was kneaded with 3.02 g PEG and sufficient water to make a paste. The paste was kneaded several hours. The paste was extruded into 1/4" and 1/2" diameter cylinders and allowed to air dry. The sample was heated in a high temperature furnace under one atmosphere of argon gas at 30° C. per minute to 1800° C. and held at that temperature for one hour. The extrudates were strong, conductive, and sintered with retention of their shape without cracking. The composition was determined by X-ray diffraction to be single phase $Ti(O_{0.501}C_{0.499})$. The apparent density was 2.78 g/cc. The specific conductivity was $3.14 \times 10^5$ S/m. The crush strength exceeded 48.6 pounds (216 Newtons) for both sizes of extrudates, which is the limit of the gauge.

Example 4

This example demonstrates (vs. 1) that the heating rate has little effect on the carbon content of the resultant single phase $Ti(O_xC_{1-x})$ material, but a significant effect on the apparent density. 500.00 g $TiO_2$, 134.27 g Chevron carbon ($C/TiO_2$=1.79), and 19.0 g cellulose were rolled in a 2-liter plastic jar for 2 hours to mix well. 382.5 g of this mixture was kneaded with 244 g water and 2.44 g PEG for about 100 minutes. The paste was extruded into 1/4" diameter cylinders and allowed to air dry. A sample was heated in a high temperature furnace under one atmosphere of argon gas at 5° C. per minute to 1800° C. and held at that temperature for one hour. The extrudates were strong, conductive, and sintered with retention of their shape without cracking. The composition was determined by X-ray diffraction to be single phase $Ti(O_{0.556}C_{0.444})$. The apparent density was 1.62 g/cc. The specific conductivity was $3.10 \times 10^5$ S/m. The crush strength exceeded 48.6 pounds (216 Newtons), which is the limit of the gauge.

Example 5

This example demonstrates (vs. 4) that, at the same $C/TiO_2$ ratio and the same heating rate, the source of carbon has relatively little impact on the resultant single phase $Ti(O_xC_{1-x})$ material. 473.24 g $TiO_2$, 127.44 g graphite ($C/TiO_2$=1.79), and 18.05 g cellulose were rolled in a 2-liter plastic jar for 26 minutes to mix well. All of this mixture was kneaded with 188.67 g water and 1.90 g PEG for about 180 minutes. The paste was extruded into 1/2" diameter cylinders and allowed to air dry. The sample was fired in a high temperature furnace under one atmosphere of argon gas at 5° C. per minute to 1800° C. and held at that temperature for one hour. The extrudates were strong, conductive, and sintered with retention of their shape without cracking. The composition was determined by X-ray diffraction to be single phase $Ti(O_{0.577}C_{0.423})$. The apparent density was 1.74 g/cc. The specific conductivity was $8.52 \times 10^3$ S/m. The crush strength exceeded 48.6 pounds (216 Newtons), which is the limit of the gauge.

Example 6

This example demonstrates (vs. 1) that as the $C/TiO_2$ ratio increases, the carbon content of the resultant single phase $Ti(O_xC_{1-x})$ material also increases. 559.28 g $TiO_2$, 168.17 g Pureblack® carbon ($C/TiO_2$=2.00), and 21.87 g cellulose were rolled in a 2-liter plastic jar for 2 hours to mix well. All of this mixture was kneaded with 284.64 g water and 2.8324 g PEG for about 60 minutes. The paste was left in the kneader overnight with the lid on to prevent moisture loss. The next day, the paste was kneaded an additional 60 minutes. The paste was extruded into 1/2" diameter cylinders. The extrudates were allowed to air dry at room temperature. They were further dried at 105° C. The sample was heated in a high temperature furnace under one atmosphere of argon gas at 30° C. per minute to 1800° C. and held at that temperature for one hour. The extrudates were strong, conductive, and sintered with retention of their shape without cracking. The composition was determined by X-ray diffraction to be single phase $Ti(O_{0.434}C_{0.566})$. The crush strength exceeded 48.6 pounds (216 Newtons), which is the limit of the gauge.

Comparative Example 1

This example demonstrates the effect of not adding a binder. 569.37 g $TiO_2$ and 161.81 g Pureblack® carbon were rolled in a 2-liter plastic jar for 3 hours to mix well. All of this mixture was kneaded with 313.89 g of a 1% aqueous PEG solution for 177 minutes. The paste was not elastic and crumbled easily. The paste was extruded into ½" diameter cylinders. The surface of the extrudates was rough. The extrudates were allowed to air dry at room temperature. They were further dried at 100° C. The dried extrudates were dusty and weak. The extrudates were heated in a high temperature furnace under one atmosphere of argon gas at 30° C. per minute to 1800° C. and held at that temperature for one hour. The sintered extrudates were cracked and did not retain their shape, and thus would not be desirable for use as anodes for Ti production.

What is claimed is:

1. A process comprising:
   a) kneading a mixture comprising;
      i) $TiO_2$ particles
      ii) carbon particles
      iii) a binder
      iv) a solvent
   to form a kneaded mixture
   b) extruding the kneaded mixture to form an extruded mixture
   c) allowing the solvent to evaporate from the extruded mixture to form a green body
   d) firing the green body to form a composition comprising single phase $Ti(O_{0.5\pm x}C_{0.5\pm x})$ wherein x is less than 0.2.

2. A process comprising:
   a) processing a mixture comprising:
      i) $TiO_2$ particles
      ii) carbon particles
      iii) a binder
      iv) a solvent
   in a kneader-extruder to form an extruded mixture
   b) allowing the solvent to evaporate from the extruded mixture to form a green body
   c) firing the green body to form a composition comprising single phase $Ti(O_{0.5\pm x}C_{0.5\pm x})$ wherein x is less than 0.2.

* * * * *